Dec. 24, 1963
F. J. CRANDELL
3,115,323
VIBRATION ISOLATORS
Filed June 16, 1961
2 Sheets-Sheet 1
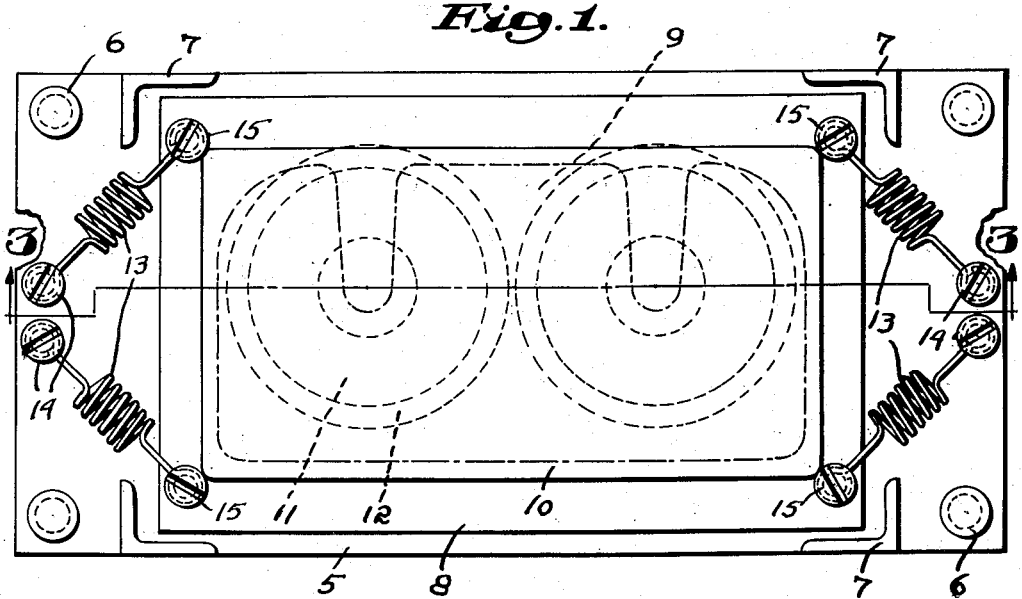
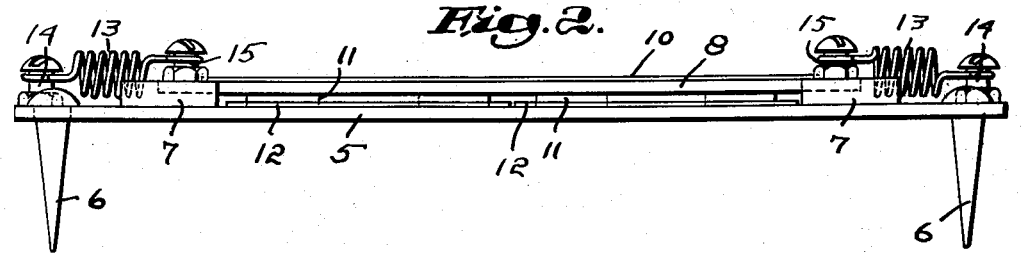
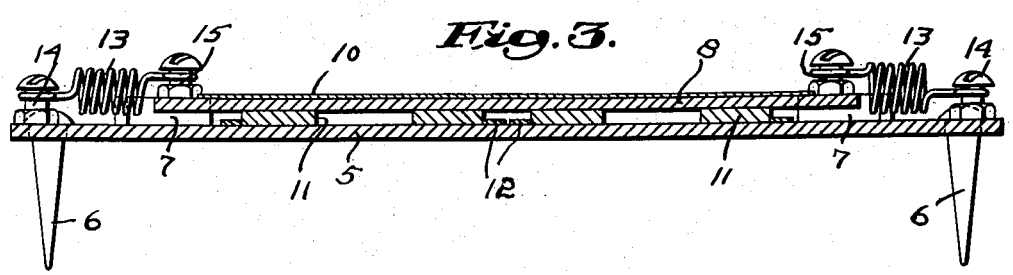
Inventor:
Francis J. Crandell,
by Abbot Spear,
Attorney Dec. 24, 1963     F. J. CRANDELL     3,115,323
VIBRATION ISOLATORS Filed June 16, 1961     2 Sheets-Sheet 2

INVENTOR.
*Francis J. Crandell,*
BY
*Attorney*

United States Patent Office 3,115,323
Patented Dec. 24, 1963

1

3,115,323
VIBRATION ISOLATORS
Francis J. Crandell, 24 Beverly Road, Wellesley, Mass.
Filed June 16, 1961, Ser. No. 120,133
9 Claims. (Cl. 248—20)

The present invention relates to vibration isolators for use in the support of equipment whose operation is attended by objectionable vibrations and this application is a continuation-in-part of my co-pending application Serial No. 849,963, filed October 30, 1959, now abandoned.

In the use of many types of equipment, vibrations result that are objectionable if transferred to the supporting surface. By way of example of the problems involved, particular reference is made to looms as their operation is attended by horizontal vibrations due to the action of the laybar and the picker stick as well. Such vibrations are quite pronounced and, when the energy represented thereby is transmitted through floors to the walls of the building, structural damage often results over a period of years and necessitates costly and time-consuming repairs.

The principal objective of the invention is to provide means for isolating the vibration by means that enable the loom or other equipment to have limited movement, in any direction in a plane, thus to absorb the unwanted energy in work and such movement may be yieldably and resiliently opposed.

In accordance with the invention, this objective is attained by providing isolators each of which comprises a bottom plate to be fixed to the supporting surface for the equipment, a top plate for use in the support of the equipment, and anti-friction means between the plates. The bottom plate is provided with means loosely confining the top plate for limited horizontal movement relative thereto in any direction and, where such movement is yieldably opposed by resilient connections between the plates, such are preferably in the form of a pair of springs at each end of the isolator centrally connected to the bottom plate and each attached to an appropriate one of the adjacent corners of the top plates thereof.

It is preferred that the anti-friction means are in the form of washer-like rings carried by one plate for engagement with the other plate and that the means confining the top plate for limited movement relative to the bottom plate be a member carried by the other plate and dimensioned to enter freely the recess of such a ring and permit the desired amount of movement before engaging therewith. It is preferred that such members also be of anti-friction material.

In the accompanying drawings, there are shown illustrative embodiments of the invention from which these and other of its objectives, novel features, and advantages will be readily apparent.

In the drawings:

FIG. 1 is a plan view of an isolator in accordance with the invention,

FIG. 2 is a side view thereof,

FIG. 3 is a section taken approximately along the indicated lines 3—3 of FIG. 1.

2

Figure 5:

FIG. 5 is a side view thereof, and

Figure 6:
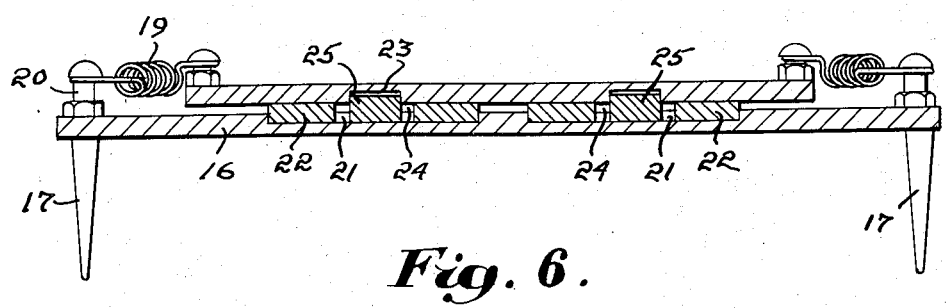

FIG. 6 is a section taken approximately along the indicated lines 6—6 of FIG. 5.

In the embodiment of the invention illustrated by FIGS. 1–3, a bottom plate 5 is adapted to be secured to the supporting surface for the equipment as by corner anchors 6. The plate 5 has corners 7 defining a rectangular area whose length and width are somewhat greater than the coresponding dimensions of the top plate 8. The plate 8 receives the indicated foot 9 of equipment, such as a loom, whose use is attended by horizontal vibrations which are to be isolated, and while the foot 9 may be otherwise connected thereto, the plate 8 is shown as having a foot contacting surface layer 10 of any suitable anti-slip material.

Suitable anti-friction means between the plates 5 and 8 ensure that the plate 8, in support of the foot 9, may move freely therewith relative to the plate 5 within the limits of the area defined by the corners 7. Such anti-friction means may conveniently comprise any material that retains its anti-friction qualities without servicing. In practice, the anti-friction means are in the form of washer-like rings 11 which are resiliently compressible and are confined in annular stops 12 which are somewhat thinner than the rings 11.

Movement of the plate 8 relative to the plate 5 in any planar direction is yieldably opposed by springs 13 which are preferably arranged in pairs and each pair is connected to the plate 5 as by closely spaced pins 14 centrally of each of its ends and to the plate 8 by pins 15 located at the corners proximate thereto.

Figure 4:
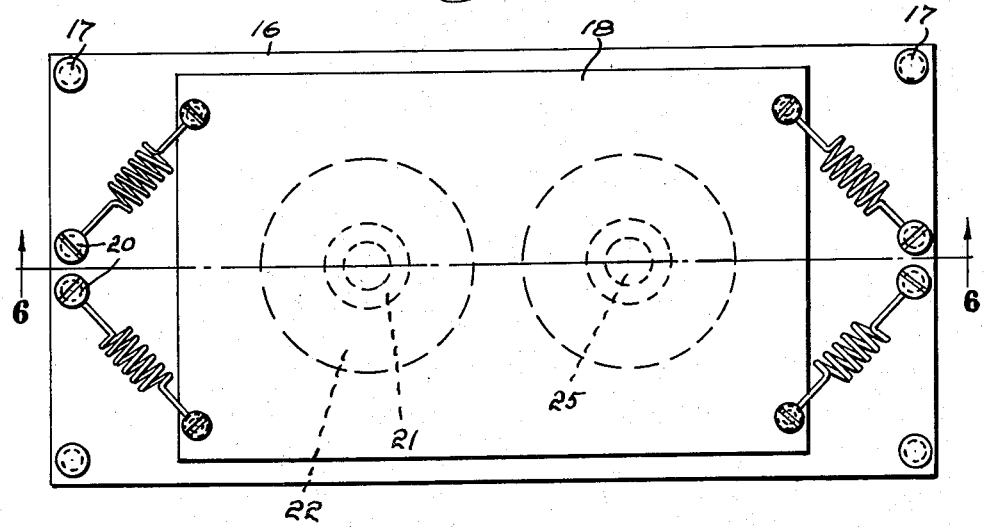
FIG. 4 is a plan view of an isolator in accordance with another embodiment of the invention.

The embodiment of the invention illustrated by FIGS. 4–6 is generally similar to the isolator just described in that it comprises a bottom plate 16 having depending corner anchors 17. Its top plate 18 is movable relative to the bottom plate with such movement being yieldably opposed by springs 19 which, like the springs 13, are arranged in end pairs, one extending from each corner of the top plate 18 to a pin 20 located near the center of the bottom plate 16 adjacent that end.

In accordance with the invention, the bottom plate 16 is provided with a pair of circular recesses 21. Each recess 21 receives a washer-like ring 22 of any suitable anti-friction material, preferably one that retains its anti-friction qualities over long periods without servicing. The top plate 18 is shown as having sockets 23 one for each ring 22 and concentric, when the top plate 18 is centered, with the circular recess 24 of an appropriate one of the rings 22 but of smaller size. A stud member 25 is seated in each socket 23 and is loosely confined by the subjacent ring 22 which serves as a circular stop limiting movement of the top plate 18 relative to the bottom plate 16. Preferably, each stud member engages the bottom plate 16 and is itself of anti-friction material.

In practice the anti-friction means, the washer-like rings 11 and 22, and the stud members 25 are formed of a polytetrafluoroethylene resin and that sold by E. I. du Pont de Nemours & Co. under the trademark Chemlon has proved satisfactory in use.

In the use of vibration isolators in accordance with the invention, the unwanted energy is absorbed in work by permitting the equipment to move. In some instances, the use of yieldable and resilient means opposing such movement is desirable because of the opposition provided and because such means tend to center an upper plate relative to its lower plate.

It will be particularly noted that, in the embodiment of the invention illustrated by FIGS. 4–6, the stud members are of circular section and dimensioned to fit freely within the washer-like rings 22 to permit limited relative movement between the plates. In practice, the inside diameter of the rings 22 is in the order of one inch and the outside diameter of the studs is in the order of five-eighths of an inch. While the dimensions are not critical, it is essential that the differences in size be sufficiently near that ratio to ensure that engagement of the studs with their washer-like rings invites a more or less circular movement of the former.

I claim:

1. A vibration isolator for receiving a foot of equipment whose use results in the transfer of objectionable horizontal vibrations through the supporting surface for the equipment, said isolator comprising a rectangular bottom plate to be anchored to said surface, a top plate to receive a foot of the equipment, an anti-friction bearing between said plates loosely confining said top plate for limited, horizontal movement relative to said bottom plate, and resilient means interconnecting said plates and yieldably opposing any such movement, said resilient means comprising a pair of springs at each end of said bottom plate and connected thereto adjacent the middle thereof and to said top plate adjacent a respective one of the proximate corners thereof.

2. A vibration isolator for receiving a foot of equipment whose use results in the transfer of objectionable horizontal vibrations through the supporting surface for the equipment, said isolator comprising a bottom plate to be anchored to said surface, a rectangular top plate to receive a foot of the equipment, an anti-friction bearing between said plates arranged to loosely confine said top plate for limited, horizontal movement relative thereto, and resilient means interconnecting said plates and yieldably opposing any such movement, said resilient means comprising a pair of springs at each end of said bottom plate and connected thereto adjacent the middle thereof and to said top plate adjacent a respective one of the proximate corners thereof.

3. A vibration isolator for receiving a foot of equipment whose use results in the transfer of objectionable horizontal vibrations through the supporting surface for the equipment, said isolator comprising a bottom plate to be anchored to said surface, a top plate to receive a foot of the equipment, one plate including a portion having a central opening and the other plate including a member of circular section dimensioned to be a loose fit within said opening thus to be able to move in any planar direction relative thereto, said opening establishing a curved abutment engageable by said member in any direction of its movement thereby to provide for the return movement of said member along a curving path on such engagement, said portion being of stock characterized by its low coefficient of friction.

4. A vibration isolator for receiving a foot of equipment whose use results in the transfer of objectionable horizontal vibrations through the supporting surface for the equipment, said isolator comprising a bottom plate to be anchored to said surface, a top plate to receive a foot of the equipment, anti-friction means between said plates loosely confining said top plate for limited horizontal movement relative to said bottom plate, and resilient means interconnecting said plates and yieldably opposing any such movement, said anti-friction means being in the form of an anti-friction member carried by one plate for engagement with the other plate and having a recess and a stud member of circular section carried by the other plate and entrant of said recess and loosely confined therein to permit limited relative movement of said stud member in any planar direction, said recess establishing a curved abutment engageable by said stud member on relative movement in any direction thus to urge said stud member along a curving path on such engagement.

5. A vibration isolator for receiving a foot of equipment whose use results in the transfer of objectionable horizontal vibrations through the supporting surface for the equipment, said isolator comprising a bottom plate to be anchored to said surface, a top plate to receive a foot of the equipment, anti-friction means between said plates loosely confining said top plate for limited horizontal movement relative to said bottom plate, said anti-friction means being in the form of an anti-friction member carried by one plate for engagement with the other plate and having a circular recess and an anti-friction stud member of circular section carried by the other plate and entrant of said recess and loosely confined by said first named member to permit planar movement of said top plate relative to said bottom plate.

6. A vibration isolator for receiving a foot of equipment whose use results in the transfer of objectionable horizontal vibrations through the supporting surface for the equipment, said isolator comprising a bottom plate to be anchored to said surface, a top plate to receive a foot of the equipment, and anti-friction means between said plates loosely confining said top plate for limited horizontal movement relative to said bottom plate, said anti-friction means being in the form of a pair of washer-like members of anti-friction material carried by one plate for engagement with the other plate and stud members of circular cross section, one for each washer-like member, carried by the other plate and entrant of the central opening of and loosely confined by the appropriate one of said first named members, said washer-like members presenting a curved abutment engageable by said stud members in any direction of movement thereby to provide for their return movement along a curving path on such engagement.

7. A vibration isolator for receiving a foot of equipment whose use results in the transfer of objectionable horizontal vibrations through the supporting surface for the equipment, said isolator comprising a bottom plate to be anchored to said surface, a top plate to receive a foot of the equipment, anti-friction means between said plates loosely confining said top plate for limited horizontal movement relative to said bottom plate, and resilient means interconnecting said plates and yieldably opposing any such movement, said anti-friction means being in the form of a pair of washer-like members of anti-friction material carried by one plate for engagement with the other plate and presenting a circular abutment and stud members of anti-friction material and of circular section with their diameters being less than that of said abutment, one for each washer-like member, carried by the other plate and entrant of the central opening of and loosely confined by the appropriate one of said first named members.

8. A vibration isolator for receiving a foot of equipment whose use results in the transfer of objectionable horizontal vibrations through the supporting surface for the equipment, said isolator comprising a bottom plate to be anchored to said surface and having a pair of sockets in its upper surface, a top plate to receive a foot of the equipment and having a pair of sockets in its lower surface, each concentric with an appropriate bottom plate socket when said top plate is centered thereon, and anti-friction means between said plates loosely confining said top plate for limited horizontal movement relative to said bottom plate, said anti-friction means being in the form of washer-like, anti-friction members having a circular opening, one for each base plate socket and lodged therein, and anti-friction stud members of circular section and of a diameter materially less than that of said openings, one for each top plate socket and lodged therein and entrant of the recess to engage said bottom plate and loosely confined by the washer-like member that is lodged therein.

9. A vibration isolator for receiving a foot of equipment whose use results in the transfer of objectionable horizontal vibrations through the supporting surface for the equipment, said isolator comprising a bottom plate to be anchored to said surface and having a pair of sockets in its upper surface, a top plate to receive a foot of the equipment and having a pair of sockets in its lower surface, each concentric with an appropriate bottom plate socket when said top plate is centered thereon, anti-friction means between said plates loosely confining said top plate for limited horizontal movement relative to said bottom plate, and resilient means interconnecting said plates and yieldably opposing any such movement, said anti-friction means being in the form of washer-like, anti-friction members, one for each base plate socket and lodged therein and having a circular opening, and anti-friction stud members of circular section and of a diameter materially less than that of said opening, one for each top plate socket and lodged therein and entrant of the recess to engage said bottom plate and loosely confined by the washer-like member that is lodged therein.

References Cited in the file of this patent
UNITED STATES PATENTS

| | | |
|---|---|---|
| 1,203,633 | Kurowski | Nov. 7, 1916 |
| 1,915,466 | Lilly | June 27, 1933 |
| 2,718,393 | Watson | Sept. 20, 1955 |
| 2,819,896 | Watson | Jan. 14, 1958 |

FOREIGN PATENTS

| | | |
|---|---|---|
| 1,141,042 | France | Mar. 11, 1952 |